Oct. 26, 1971  J. L. WESCOTT  3,615,004
INDEXING DRILL CONTAINER
Filed April 6, 1970  2 Sheets-Sheet 1

INVENTOR.
JOHN L. WESCOTT
BY
Drummond, Cahill & Phillips
ATTORNEYS

Oct. 26, 1971  J. L. WESCOTT  3,615,004
INDEXING DRILL CONTAINER
Filed April 6, 1970  2 Sheets-Sheet 2

INVENTOR.
JOHN L. WESCOTT
BY
Drummond, Cahill & Phillips
ATTORNEYS

United States Patent Office 3,615,004
Patented Oct. 26, 1971

3,615,004
INDEXING DRILL CONTAINER
John L. Wescott, 3702 N. 48th Place,
Phoenix, Ariz. 85018
Filed Apr. 6, 1970, Ser. No. 25,692
Int. Cl. B65d 85/24
U.S. Cl. 206—17                                3 Claims

ABSTRACT OF THE DISCLOSURE

A cylindrical container has a plurality of recesses longitudinally oriented along the perimeters of concentric circles disposed about the longitudinal axes of the cylinder. The recesses are sized and dimensioned to receive twist drills and similar tools in varying sizes. Two covers, the first fitting over the end of the cylinder in which the recesses are drilled and the second fitting over the first cover, are rotatably secured to the end of the cylinder. Index legends are scribed on the cylindrical surface of the cylinder adjacent the covered end. The two covers are provided with apertures so disposed that only one recess is open at a time, and the corresponding drill size legend in the index is visible on the side of the cylinder through registered windows in the sides of the covers. The visible index legend corresponds to the size drill stored in the corresponding recess. Detent means are also provided to hold the covers relative the cylinder in a closed position or in any one of a plurality of preselected open positions communicating with the various recesses in the cylinder.

---

This invention pertains to containers for storing and dispensing twist drills and similarly shaped and dimensioned tools.

In another aspect, this invention pertains to such containers having a visible index as a guide to the selection of the proper tool sought.

Containers of this general type are well known to the prior art. There are, however, certain difficulties attaching to the prior art devices which difficulties detract from the convenience and utility of such devices. One of these difficulties is that the prior art devices utilized exposed index characters which were so positioned as to be subject to abrasion in the ordinary course of use, and when stored in tool boxes where the device comes into jostling contact with other tools and implements, thus obliterating the index legends. Certain of the prior art devices are unduly complicated and have a multiplicity of small moving parts which are subject to jamming and other malfunction after extended use or in the presence of dust, grease and like contaminants.

It is therefore an objct of this invention to provide an indexing drill container which has a minimum of moving parts, and which can be conveniently and inexpensively maufactured.

It is further an object of this invention to provide such a device which is ruggedly constructed and dependable in the presence of hard use and adverse conditions.

It is yet another object of this invention to provide an index which is well protected from obliteration by wear and which is convenient to use and simple to understand.

Other, further and more specific objects and advantages of the invention disclosed will become apparent to those skilled in the art from the following description of the invention taken in conjunction with the drawings in which.

Figure 1:
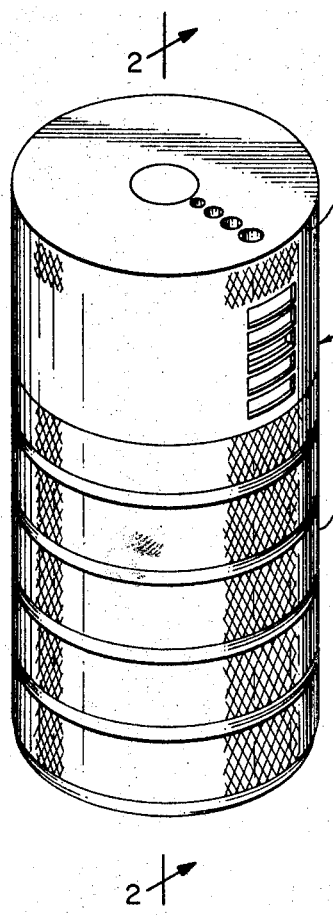
FIG. 1 is a perspective view of the invention.

Briefly, there is provided a device for indexing, storing and dispensing twist drills and similarly dimensioned tools. The device comprises a cylinder having a base end, a top end having a plurality of longitudinal elongate recesses formed in the top end to receive the drills, the recesses disposed in a plurality of concentric rows about the longitudinal axis of the cylinder, and a longitudinal outside surface having a pluarilty of legends keyed to the size drills or other similarly dimensioned tools to be dispensably stored in the device; a first cap member rotatably secured to the top end of the cylinder, the first cap member closely fitting the top end and a portion of the outside surface of the cylinder adjacent the top end, the first cap member including means for rotatably securing the first cap member to the top end so as to rotate around the longitudnial axis of the cylinder, means for releasably detaining the first cap member at any one of a plurality of predetermined positions relative the recesses in the cylinder, a top having apertures adapted to register with one recess in each of the concentric rows around the axis of the cylinder, and sides having slots adapted to show the legends pertaining to the recesses communicating with the apertures in the top, and; a second cap member adapted to closely fit over a portion of the first cap member and having means for rotatably securing the second cap member to permit it to rotate around the longitudinal axis of the cylinder, means for releasably detaining the second cap member at any one of a plurality of predetermined positions relative the recesses in the cylinder, a top having a plurality of ports adapted to register simultaneously with one recess in each of the concentric rows in the top end of the cylinder and only one of the apertures in the top of the first cap member whereby only one of the recesses in the cylinder is exposed at a time, and sides having window openings adapted to register with only one of the slots in the sides of the first cap member such that one legend only is visible through the registered slot and window opening in the first and second cap members, the visible legend corresponding to and identifying the recess in the cylinder exposed by the rigistered aperture and port in the first and second cap members.

Also provided is the device of claim 1 wherein the means for rotatably securing the first and second cap members to the cylinder comprises a threaded bore disposed along the longitudinal axis of the cylinder and in the geometric center of the top end of the cylinder; pivot means defining a circular port in the geometric centers of the tops of the first and second cap members; and a bolt having a threaded end adapted to engage the threaded bore in the cylinder, a smooth cylindrical shank journaled in the pivot means, and a flange adapted to engage the top of the second cap member whereby the first and second cap members are rotatably constrained.

Also provided is the invention of claim 1 wherein the means for detaining the first and second cap members in any desired position relative the recesses in the cylinder comprises means defining a detent port in the top of the first cap member, the detent port being positioned to register with the recesses in one of the concentric rows of recesses in the top end of the cylinder as said cap member is rotated and having a larger diameter than the recesses; means defining a concentric row of spherical spot faces in the inside surface of the top of the second cap member, the concentric row of spherical spot faces being positioned to register with the detent port as the cap members are rotated; two bearing pieces disposed within the detent port, the pieces having rounded end surfaces for contacting and releasably engaging the recesses in the top end of the cylinder and the spherical spot faces in the second cap member, the bearing pieces closely fitting within the detent port; and biasing means disposed within the detent port between the bearing pieces for urging the bearing pieces against the recesses and the spherical spot faces.

Turning now to the drawings, the reader's attention is invited to FIG. 1 which shows the index drill container device 1 in a presently preferred embodiment wherein the cylinder 2 is machined out of a solid block of aluminum. This cylinder 2 could also be made out of a number of light metal alloys and also out of plastic materials suitable for such purposes. The remaining may likewise be constructed of suitable light metals, alloys or plastics.

Figure 2:
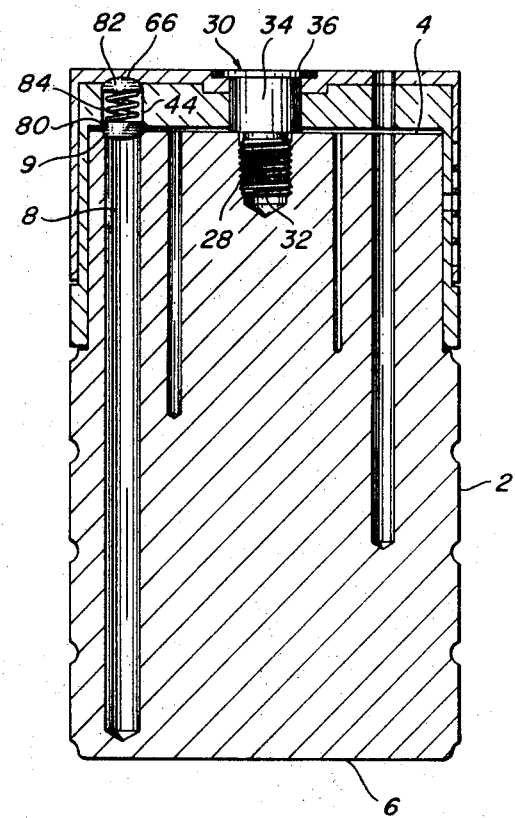
FIG. 2 is an elevation view, in section, along the line 2—2 of the device of FIG. 1.
Figure 3:
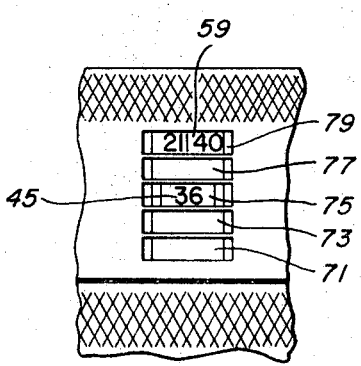
FIG. 3 is an enlarged view of the window openings shown in the view of FIG. 1.
Figure 4:
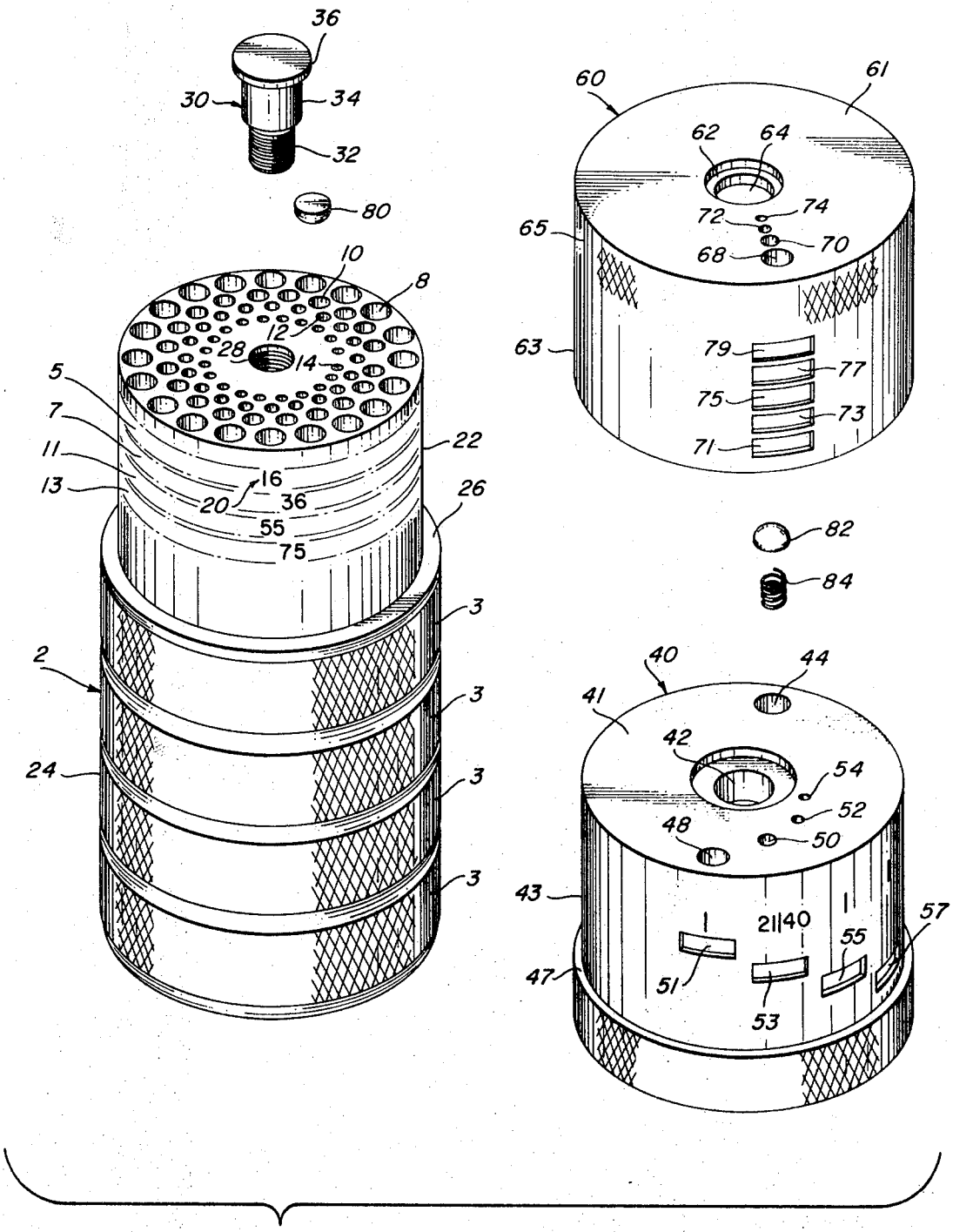
FIG. 4 is an exploded view, in perspective, of the various elements of the device shown in FIG. 1.

As seen in FIG. 2, the cylinder 2 has a top end 4 and a base end 6. The top end 4 has a plurality of longitudinal recesses 8, 10, 12, 14 disposed along the perimeters of circles concentrically disposed about the longitudinal axes of the cylinder. In this preferred embodiment there are four such concentric rows which are sized and positioned to accommodate twist drill tools ranging from size 1 through 80 A.W.G. (American wire gauge). They may be designated in the index 20 by the A.W.G. number or alternatively in 64ths. The diameter of the cylinder 2 at the upper portion 22, adjacent the top end 4, is narrower than the lower portion 24, thus creating a shoulder 26. On the upper portion 22 the index 20 of tool numbers is scribed. The relationship between the position of the legend in the index 20 and the various apertures in the first cap member 40 and the second cap member 60 will be later described. In this embodiment, there is a threaded bore 28 tapped into the geometric center of the top end 4 of the cylinder 2. A bolt 30 has a threaded end 32 which engages the threaded bore 28 in the cylinder 2. The bolt 30 has a smooth cylindrical shank 34 which serves as a pivot pin surface for the first cap member 40. The bolt 30 also has a flange 36 which serves as a pivot surface for the second cap member 60. The flange 36 serves the further function of engaging a flange 62 in the second cap member 60 to hold both cap members into close fitting position relative the top end 4 and upper portion 22 of the cylinder 2. The circular port 42 in the first cap member 40 and the circular port 64 in the second cap member 60 serve as pivot means in which the bolt 30 is journaled. Thus, the first cap member 40 and the second cap member 60 are rotatably constrained by the bolt 30. The first cap member 40 is provided with a detent port 44 which communicates between a plurality of spherical spot faces 66 disposed along the perimeter of a circle concentrically disposed about the circular port 64 in the top 41 of the first cap member 40. The circle of spherical spot faces is not shown in the drawings. One spherical spot face 66 is shown in FIG. 2. The detent port 44 has a slightly larger diameter than the row of recesses 8 in order to provide a bearing surface 9 for the bearing piece 80. There are two bearing pieces 80 and 82 disposed within the detent port 44. In this preferred embodiment, a helical spring 84 is disposed between the bearing pieces 80 and 82 to urge them against the spherical spot face 66 and the bearing surface 9 of the recesses 8. Thus it is possible to rotate the first cap member 40 and the second cap member 60 relative the cylinder 2 and relative each other by exerting torsional force against either one of the cap members 40 and 60. The first cap member 40 is provided with a top 41 having apertures 48, 50, 52, 54 which are dimensioned to respectively register with ports 68, 70, 72, 74 in the top 61 of the second cap member 60 and to register respectively with recesses 8, 10, 12, 14 in the top end 4 of the cylinder 2. However, the reader's attention is called to the disposition of the apertures 48, 50, 52, 54 in the top 41 of the first cap member 40, each of which lies along a differing radial emanating from the geometric center of the top 41, whereas the ports 68, 70, 72, 74 in the top 61 of the second cap member 60 all lie along the same radial emanating from the geometric center of the top 61 of the second cap member 60. Thus, it is possible for only one aperture in the top 41 of the first cap member 40 to register with an aperture from the top 61 of the second cap member 60 in any given position. These registering ports will, consequently, communicate with only one recess 8, 10, 12 or 14 in the top end 4 of the cylinder 2 at any given position. The slots 51, 53, 55, 57 in the sides 43 of the first cap member 40 also lie along extensions of the radials occupied respectively by apertures 48, 50, 52, 54 in the first cap member 40. Similarly, the window openings 71, 73, 75, 77, 79 lie along the extension of the same radial which passes through ports 68, 70, 72, 74 in the second cap member 60. Slots 51, 53, 55, 57 in the sides 43 of the first cap member 40 and window openings 71, 73, 75, 77 in the sides 63 of the second cap member 60 are keyed to the index 20 scribed on the upper portion 22 of the index 20, and related in such a way to the apertures 48, 50, 52, 54 in the top 41 of the first cap member 40 and the ports 68, 70, 72, 74 in the top 61 of the second cap member 60 and the recesses 8, 10, 12, 14 in the top end 4 of the cylinder 2 that a single legend from the index 20 is visible through the sides 43 and 63 of the first cap member 40 and the second cap member 60 and this legend indicates the recess which is open and the size of the tool in the recess. Showing only one size number is a positive benefit which minimizes the possibility of error in the selection of the drill size. There is scribed on the side 43 of the first cap member 40 information concerning the range of tool sizes which may be located in the column of view openings below. This indicator may be viewed through window opening 79 in the sides 63 of the second cap member 60. Referring to FIG. 3, the range indicator 59 appears in the top through window opening 79. Below that, as an example, a particular legend 45 is visible through window opening 75. In use the second cap member 60 is positioned relative the first cap member 40 to show the range desired, e.g., 21/40 as shown in FIG. 3. Then the first cap member 40 is rotated until the desired tool size within the range appears in the window. The rows 5, 7, 11 and 13 are numbered consecutively 1 through 20, 21 through 40, 41 through 60, 61 through 80 respectively. The closed recess position is before 1/20 or after 61/80. All parts of the index 20 and the indicator 59 are recessed and thus protected from abrasive contact with hands and tools. The shoulder 47 of the cap member 40, the belt 65 of the side 63 of cap member 60, and body bands 3 of the cylinder 2 are knurled to provide a better gripping surface.

Having now fully described my invention and the presently preferred embodiment thereof, I claim:

1. A device for indexing, storing and dispensing twist drills and similarly dimensioned tools, said device comprising:
   (a) a cylinder having
      a base end,
      a top end having a plurality of longitudinal elongate recesses formed in said top end to receive the drills, said recesses disposed in a plurality of concentric rows about the longitudinal axis of said cylinder, and
      a longitudinal outside surface having an index bearing a plurality of legends keyed to the size drills or other similarly dimensioned tools to be dispensably stored in said device;
   (b) a first cap member rotatably secured to said top end of said cylinder, said first cap member closely fitting said top end and a portion of the outside surface of said cylinder adjacent said tope end, said first cap member including:
      means for rotatably securing said first cap member to said top end so as to rotate around the longitudinal axis of said cylinder,
      means for releasably detaining said first cap member at any one of a plurality of predetermined positions relative the recesses in said cylinder,
      a top having apertures adapted to register with one recess in each of said concentric rows around the axis of said cylinder, and sides having slots adapted to show the legends pertaining to the recesses communicating with the apertures in said top; and (c) a second cap member adapted to closely fit over a portion of said first cap member and having:

means for rotatably securing said second cap member to permit it to rotate around the longitudinal axis of said cylinder, means for releasably detaining said second cap member at any one of a plurality of predetermined positions relative the recesses in said cylinder, a top having a plurality of ports adapted to register simultaneously with one recess in each of the concentric rows in the top end of said cylinder and only one of the apertures in the top of said first cap member whereby only one of the recesses in said cylinder is exposed at a time, and sides having window openings adapted to register with only one of the slots in the sides of said first cap member such that one legend only is visible through said registered slot and window opening in said first and second cap members, said visible legend corresponding to and identifying the recess in said cylinder exposed by the registered aperture and port in said first and second cap members.

2. The device of claim 1 wherein the means for rotatably securing said first and second cap members to said cylinder comprises:

(a) a threaded bore disposed along the longitudinal axis of said cylinder and in the geometric center of the top end of said cylinder;

(b) pivot means defining a circular port in the geometric centers of the tops of said first and second cap members; and (c) a bolt having:
a threaded end adapted to engage the threaded bore in said cylinder,
a smooth cylindrical shank journaled in said pivot means, and
a flange adapted to engage the top of said second cap member whereby said first and second cap members are rotatably constrained.

3. The invention of claim 1 wherein said means for detaining said first and second cap members in any desired position relative the recesses in said cylinder comprises:

(a) means defining a detent port in the top of said first cap member, said detent port being positioned to register with the recesses in one of the concentric rows of recesses in the top end of said cylinder as said cap member is rotated and having a larger diameter than said recesses;

(b) means defining a concentric row of spherical spot faces in the inside surface of the top of said second cap member, said concentric row of spherical spot faces being positioned to register with said detent port as said cap members are rotated;

(c) two bearing pieces disposed within said detent port, said pieces having rounded end surfaces for contacting and releasably engaging the recesses in said top end of said cylinder and the spherical spot faces in said second cap member, said bearing pieces closely fitting within said detent port; and (d) biasing means disposed within said detent port between said bearing pieces for urging said bearing pieces against said recesses and said spherical spot faces.

References Cited

UNITED STATES PATENTS

| 2,351,815 | 6/1944 | Jensen | 206—17 |
| 702,904 | 6/1902 | Abraham | 206—17 |

FOREIGN PATENTS

| 257,265 | 3/1949 | Switzerland | 206—17 |

LEONARD SUMMER, Primary Examiner